United States Patent [19]
Lanouette et al.

[11] Patent Number: 5,407,111
[45] Date of Patent: Apr. 18, 1995

[54] SPORTS ACCESSORY BAG WITH CONVERTIBLE SUSPENSION MEANS

[76] Inventors: Alan J. Lanouette; Marian A. Lanouette, both of 85 Ledgeside Ave., Waterbury, Conn. 06708

[21] Appl. No.: 175,226

[22] Filed: Dec. 29, 1993

[51] Int. Cl.⁶ .............................................. A45C 9/00
[52] U.S. Cl. .................................... 224/151; 224/224; 224/42.01; 224/30 A; 224/31; 224/36; 224/42.46 R; 383/4; 383/16; 383/18; 383/22; 383/33
[58] Field of Search .............. 224/30 A, 31, 36, 42.01, 224/42.46 R, 151, 153, 224, 226; 383/4, 16, 18, 22, 24, 33; 150/106, 108

[56] References Cited

U.S. PATENT DOCUMENTS

| | | | |
|---|---|---|---|
| 1,176,598 | 3/1916 | Pollgreen | 224/42.46 R |
| 2,631,632 | 3/1953 | Leachman | 224/151 X |
| 3,674,188 | 7/1972 | Anderson | 383/18 X |
| 4,186,859 | 2/1980 | Frankfort et al. | 224/42.46 R X |
| 4,240,480 | 12/1980 | Strobel | 383/22 X |
| 4,424,841 | 1/1984 | Smith | 224/151 X |
| 4,491,258 | 1/1985 | Jones | 224/153 |
| 4,515,300 | 5/1985 | Cohen | 224/151 |
| 4,592,091 | 5/1986 | Italici | 383/24 X |
| 4,852,778 | 8/1989 | Beiser et al. | 224/30 A |
| 4,932,576 | 6/1990 | Ashley | 383/33 X |
| 5,040,711 | 8/1991 | Niederhauser et al. | 224/42.46 R |
| 5,326,175 | 7/1994 | Carter | 383/22 |

Primary Examiner—J. Casimer Jacyna
Attorney, Agent, or Firm—William C. Crutcher

[57] ABSTRACT

An improved sports accessory bag with straps which are convertible for use either with a bar on stationary exercise apparatus, or for use as a portable accessory bag. A strap is attached to one end of the bag and a second strap is attached to the opposite end of the bag. A first separable buckle is used with the first strap for forming a first suspension loop. A second separable buckle is used with the second strap for forming a second suspension loop. The first female snap receptacle and the second male snap connector are compatible for connecting the two long free ends of the two straps together, so that the first and second long free ends will form a third suspension loop. The bag may be suspended from the first and second loops on a bar member on stationary exercise apparatus, or it may be converted to a portable sports accessory bag by connecting the long ends together around a person's waist.

5 Claims, 3 Drawing Sheets

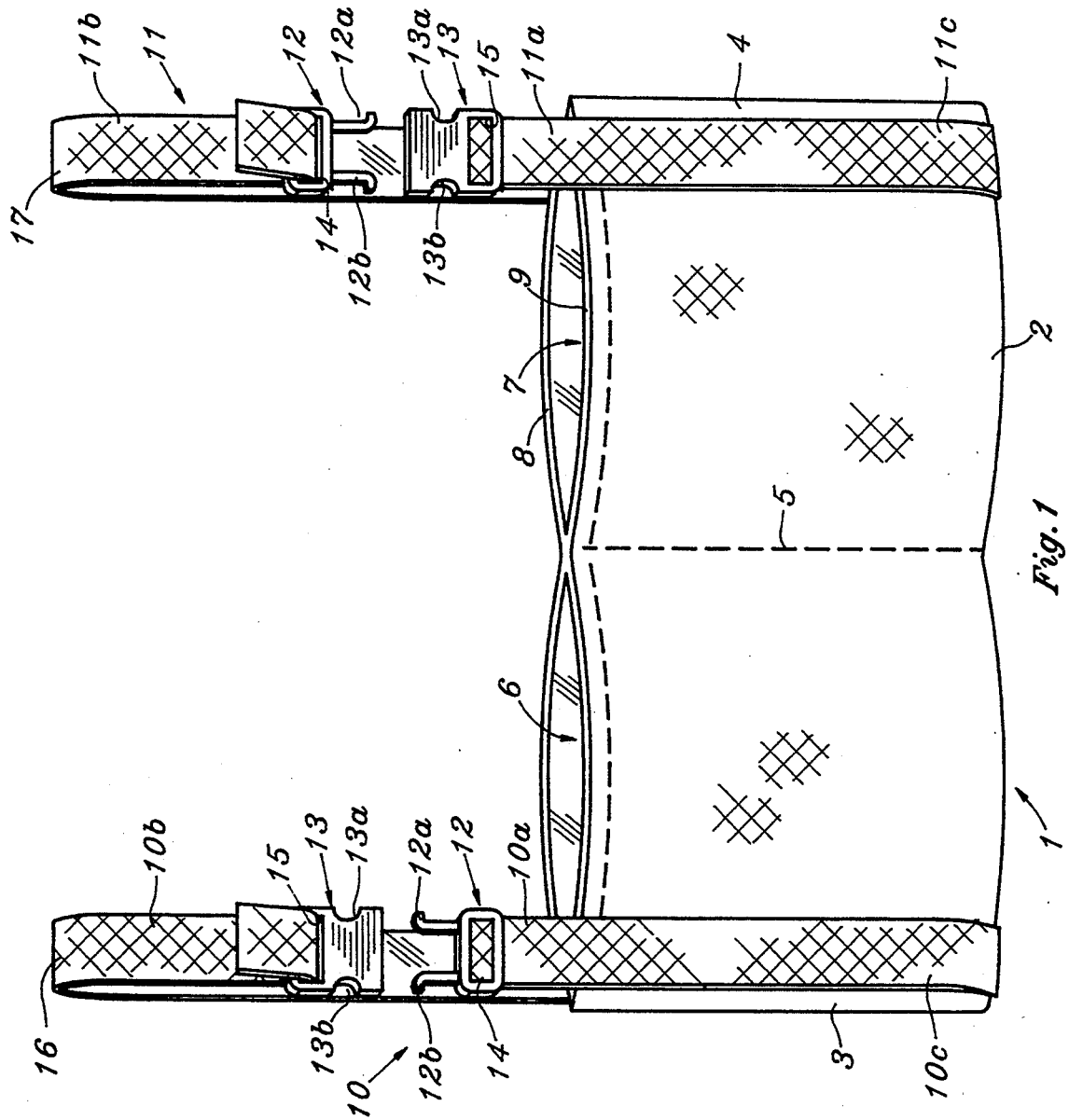

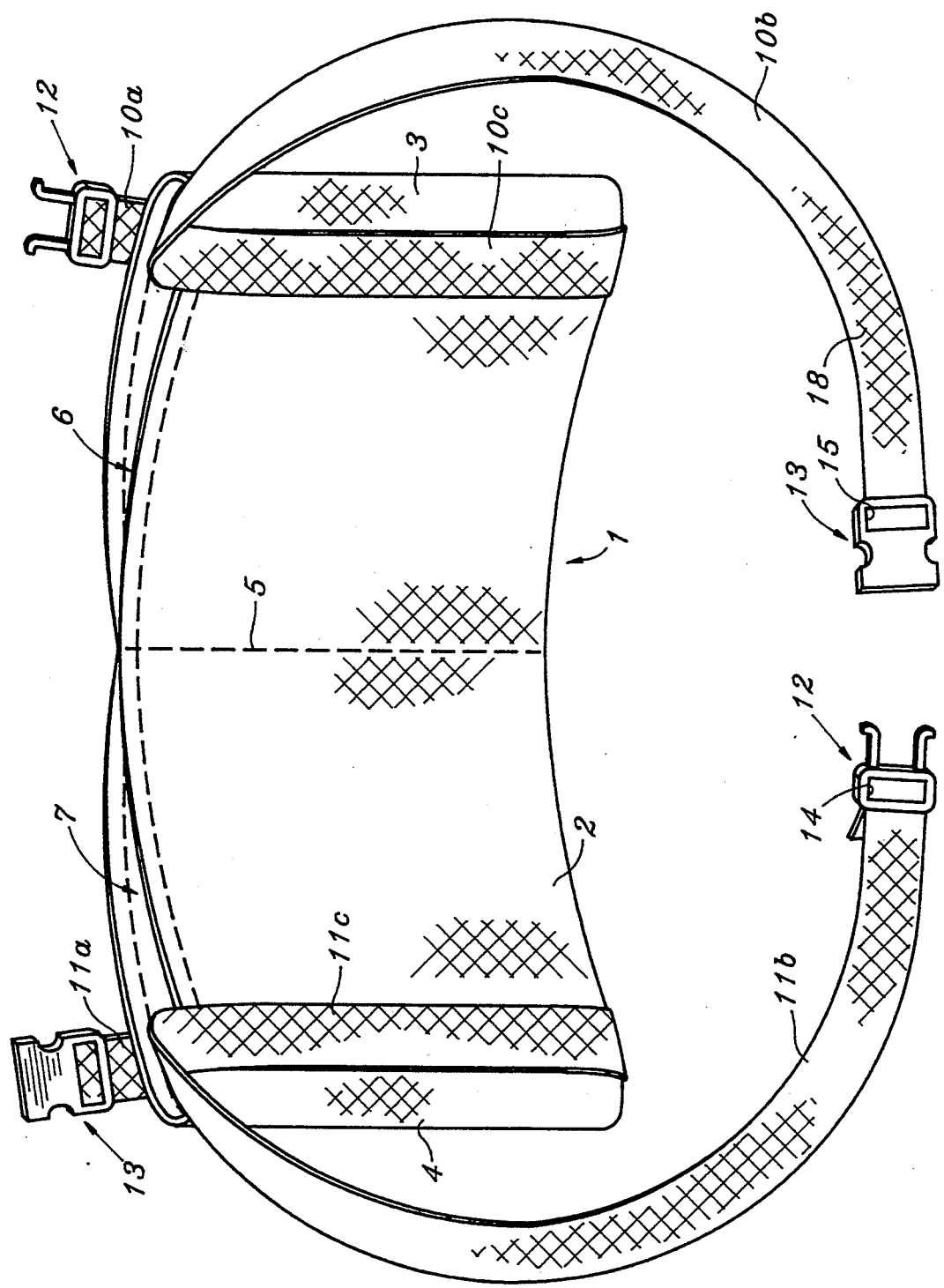

SPORTS ACCESSORY BAG WITH CONVERTIBLE SUSPENSION MEANS

BACKGROUND OF THE INVENTION

This invention relates generally to sports equipment carrying bags and more particularly to an improved suspension means.

Some types of exercise are carried out on stationary gym equipment or apparatus used in one location, whereas other exercise involves movement without accompanying apparatus, such as running. When the exercise takes place over a long period of time, it may be desirable to have various accessories to relieve the tedium such as radios or tape recorders and to provide refreshment, such as a water bottle. It would be useful to have a sports accessory bag to carry these various objects and to keep them close at hand, especially where the objects require frequent use or attachment to the body such as earphones connected by a wire to a radio or tape recorder.

Most stationary sports apparatus includes some sort of handlebar or horizontal bar on which a suitable accessory bag may be suspended. On the other hand, the suspension device may not be suitable for portable use, as may be needed by a runner.

Accordingly, one object of the present invention is to provide an improved sports accessory bag for use either with stationary apparatus or which is portable.

Another object of the invention is to provide an improved convertible suspension means for a sports accessory bag.

SUMMARY OF THE INVENTION

Briefly stated, the invention comprises an improved sports accessory bag comprising an elongated fabric bag having at least one pocket in its central portion for carrying objects used during exercise and having suspension means at opposite ends thereof which are convertible for use either with a bar on stationary exercise apparatus, or for use as a portable accessory bag. The suspension means comprises first strap means attached to one end of the bag and second strap means attached to the opposite end of the bag, each of the first and second strap means having a short free end and a long free end. A first separable buckle having a first male snap connector is attached to the first strap short free end and a first female snap receptacle is attached to the first strap long free end for forming a first suspension loop. A second separable buckle having a second female snap receptacle is attached to the second strap short free end and a second male snap connector is attached to the second strap long free end for forming a second suspension loop. The first female snap receptacle and the second male snap connector are compatible for connecting the two long free ends together so that the first and second long free ends will form a third suspension loop. The bag may be suspended from the first and second loops on a bar member on stationary exercise apparatus, or it may be convened to a portable exercise bag by connecting together the long free ends about the waist in a third suspension loop.

DRAWING

The objects and advantages of the invention will become more apparent by reference to the following drawings, taken in connection with the accompanying description, wherein FIG. 1 is a perspective view of the front of the sports accessory bag as used with stationary exercise apparatus, FIG. 2 is a perspective view of the back side of the sports accessory bag converted to portable use, FIG. 3 is a simplified schematic drawing of the suspension means illustrated with stationary exercise apparatus, and FIG. 4 is a simplified schematic view of the suspension means converted to portable use.

DESCRIPTION OF THE PREFERRED EMBODIMENTS

Figure 4:
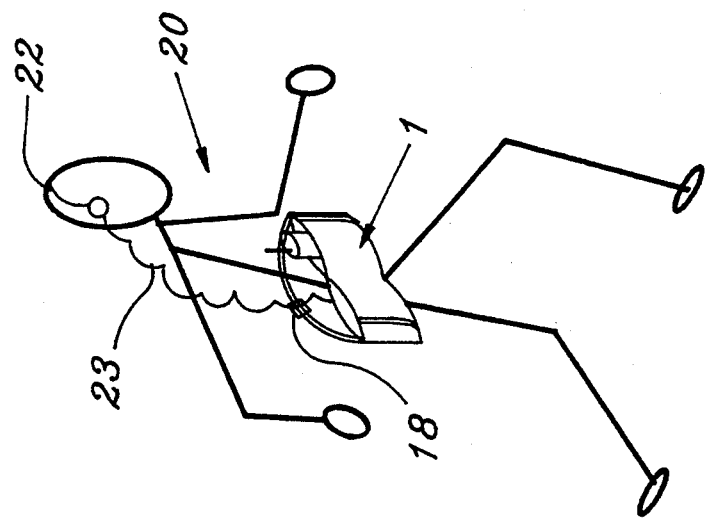

Referring now to FIG. 1 of the drawing, the sports accessory bag is indicated by reference numeral 1 as an elongated bag of natural or synthetic fabric, such as duck twill, PVC or nylon. Bag 1 is preferably folded at its bottom 2 and hemmed and sewn along its opposite ends 3, 4 to leave it open at the top. It is also preferably divided by stitching 5 to leave pocket openings 6, 7 at the top. The top seams 8, 9 are made wide enough to include plastic stiffening members (not shown) which hold pockets 6, 7 open for easy insertion of objects, as well as preventing the bag 1 from sagging in the center when supported at opposite ends 3, 4.

First strap means 10 and second strap means 11 are attached to bag 1 at its opposite ends 3, 4 respectively. First strap means 10 has a first short free end 10a and a first long free end 10b extending from a loop 10c which passes around the end of the bag and is attached by stitching. Similarly, the second strap means 11 has a second short free end 11a, a second long free end 11b, both extending from a loop 11c passing around and attached to the end of the bag. The loops 10c, 11c are shown as one continuous strap, but they need not be continuous and may comprise separate segments attached to the front and back of the bag.

The first free ends 10a, 10b are connected together by a first separable buckle member of a known type, made in two pieces comprising a male snap connector 12 and a female snap receptacle 13. Members 12, 13 are preferably made of plastic. Member 12 includes a pair of flexible prongs 12a, 12b with hooks, which are arranged to snap into suitable slots in receptacle 13, and to partially protrude from release recesses 13a, 13b in receptacle 13. Thus the prongs may be squeezed to separate the two buckle members 12, 13 in a known manner of operation. Both of the buckle members 12, 13 may be provided with strap adjustment eyelets 14, 15. Buckle members 12, 13 may be snapped together to form a first suspension loop 16.

In a similar manner, the second strap means 11 is fitted with a second separable buckle having a male snap connector 12 and a female snap receptacle 13 constructed as previously described. However in this case, the female snap receptacle 13 is attached to the short free end 11a of the second strap means, while the male snap connector 12 is attached to the long free end 11b of the second strap means. Buckle members 12, 13 may be snapped together to form a second suspension loop 17.

Referring now to FIG. 2 of the drawing, the back side of bag 1 is illustrated. The two long free ends 10b, 11b are removed from their opposite buckle members shown in FIG. 1 and are connected together by buckle members 12, 13 to form a third suspension loop 18. This is facilitated by the aforementioned construction, wherein a compatible male snap connector 12 and a female snap receptacle 13 are provided on the respective long free ends 11b, 10b. Therefore the third suspension loop 18 will be almost twice as long as the first and second suspension loops 16, 17 described in connection with FIG. 1. Means for adjusting the length of the third suspension loop 18 is provided by virtue of the adjustment eyelets 14, 15. Therefore, suspension loop 18 may be adjusted in length.

Figure 3:
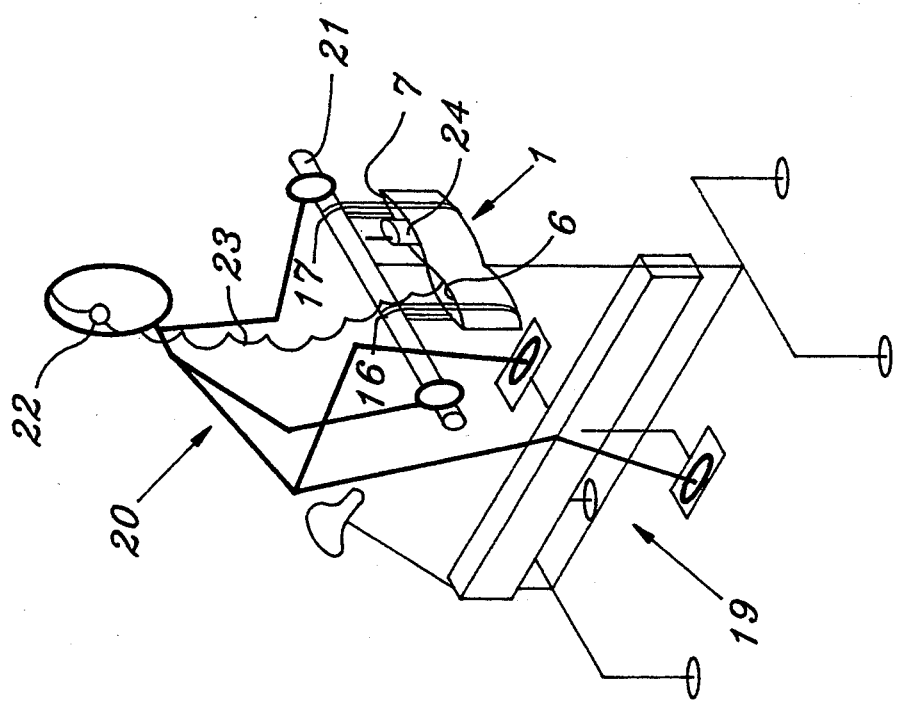

Reference to FIG. 3 of the drawing illustrates stationary exercise apparatus 19 used by an athlete 20. The stationary exercise apparatus 19 includes a horizontal bar member 21 used to suspend bag 1 by suspension loops 16, 17. Pocket 6 may carry a portable tape recorder (not shown) connected to earphones 22 by wire 23. Pocket 7 may contain a container 24 containing refreshment.

Referring to FIG. 4 of the drawing, bag 1 has been converted for portable use in the manner indicated in FIG. 2. The third suspension loop 18 is passed around the waist of athlete 20 so that it is portable. It may be used to carry a tape recorder, water bottle or other sports accessories as desired by the runner.

Therefore the improved sports accessory bag may be used to carry sports accessories either while exercising on stationary equipment or when portability is desired. This is carried out without the need for extra attachment devices and using only two separable buckles.

While there is shown what is considered to be the preferred embodiment of the invention, it is desired to secure in the appended claims all such modifications as fall within the true spirit and scope of the invention.

We claim:

1. A sports accessory bag comprising an elongated fabric member with opposite closed ends and closed bottom, said bag having first and second top seams, said bag having at least one open pocket in a central part thereof accessible between said first and second top seams for carrying objects used while exercising, and suspension means for said sports accessory bag, said suspension means being convertible for use by hanging from a bar member of stationary exercise apparatus or for portable use by carrying on a person, said suspension means comprising:

first strap means attached to one end of said bag and second strap means attached to the opposite end of said bag, each of said first and second strap means having a short free end attached adjacent said first top seam and a long free end attached adjacent said second top seam, a first separable buckle having a first male snap connector attached to the first strap means short free end and a first female snap receptacle attached to the first strap means long free end for forming a first suspension loop, a second separable buckle having a second female snap receptacle attached to the second strap means short free end and a second male snap connector attached to the second strap means long free end for forming a second suspension loop, said first female snap receptacle and said second male snap connector being adapted for connecting together said first and second long free ends to form a third suspension loop, whereby said bag may be suspended from said bar of said stationary exercise apparatus or converted to a portable exercise bag for carrying on said person by said third suspension loop.

2. The combination according to claim 1 wherein said bag is divided into at least two pockets and includes stiffener members disposed within said first and second top seams for holding said pockets open.

3. The combination of claim 1, wherein said male snap connectors comprise plastic members having a pair of flexible hooked prongs, and wherein said female snap receptacles comprise plastic housings having open slots on opposite sides thereof adapted to partially expose said prongs for separating the buckles.

4. The combination according to claim 1, and further including means for adjusting the length of at least one of said first and second strap means long free ends.

5. The combination according to claim 1, wherein said first and second strap means each include a support loop passing underneath the bag on respective ends of said bag which continues and terminates in a said short free end and a said long free end.

* * * * *